United States Patent [19]

Hermer

[11] Patent Number: 5,710,890
[45] Date of Patent: Jan. 20, 1998

[54] METHOD AND DEVICE FOR THE TRANSMISSION OF DATA ON A BUS

[75] Inventor: Jean-Pierre Hermer, Rambouillet, France

[73] Assignee: U.S. Philips Corporation, New York, N.Y.

[21] Appl. No.: 573,853

[22] Filed: Dec. 18, 1995

[30] Foreign Application Priority Data

Dec. 21, 1994 [FR] France .................................. 94 15411

[51] Int. Cl.$^6$ .................................................. G06F 13/42
[52] U.S. Cl. ........................ 395/286; 395/285; 395/550; 395/430; 395/892; 364/200; 370/54
[58] Field of Search ........................................ 395/285, 550, 395/430, 892; 364/200; 370/54

[56] References Cited

U.S. PATENT DOCUMENTS 3,720,790  3/1973  Watson et al. .
3,922,486  11/1975  DeJean .
4,689,740  8/1987  Moelands et al. .
5,488,711  1/1996  Hewitt et al. .

Primary Examiner—Jack B. Harvey
Assistant Examiner—Rupal D. Dharia
Attorney, Agent, or Firm—Steven R. Biren

[57] ABSTRACT

With a two-wire bus, the method is to be used in a system which comprises only a master and a slave. Before generating a "start" signal of the customary type, the master requesting the dialog pulls the clock wire to zero for a period which is limited but long enough (2-3), for example more than 1 mS, and also pulls the data wire to zero. The slave responds by pulling the clock wire to zero (5) for a period of time of the same order of magnitude, after which the master resets the data wire (6) and initiates a customary start procedure (7). In the case where the slave requests the dialog, only the clock wire is pulled to zero during the first phase.

6 Claims, 3 Drawing Sheets

METHOD AND DEVICE FOR THE TRANSMISSION OF DATA ON A BUS

IN THE SPECIFICATION

The present invention relates to a method for the transmission of data with the help of a two-wire bus, carried out in a device comprising:

a master station which enables control of the transmission and reception of data and comprises a data terminal and a clock terminal, a slave station which enables the transmission and reception of data and comprises a data terminal and a clock terminal, a data wire which interconnects the data terminals of the stations, a clock wire which interconnects the clock terminals of the stations, means for maintaining the bus wires at a first voltage level in the absence of forcing by the stations, each of the stations being capable of forcing one of the bus wires to a second voltage level, and the master station being capable of producing a start signal which indicates that it is ready to control the transmission of data.

The invention also relates to a device for the transmission of data with the help of a bus, comprising:

a master station which comprises a microprocessor which enables control of the transmission and reception of data and comprises a data terminal and a clock terminal, a slave station which comprises a microprocessor which enables the transmission and reception of data and comprises a data terminal and a clock terminal, a data wire which interconnects the data terminals of the stations, a clock wire which interconnects the clock terminals of the stations, means for maintaining the bus wires at a first voltage level in the absence of forcing by the stations, means in each station for forcing one of the bus wires to a second voltage level, and means in the master station for producing a start signal which indicates that it is ready to control the transmission of data.

A device of this kind is used, for example in systems comprising at least two modules for producing a processor and which are intended to communicate with one another.

A device of the kind set forth is disclosed in U.S. Pat. No. 4,689,740. The protocol used therein is the so-called "I²C" protocol. According to this protocol, the transmission of data may begin practically in the clock period following the start signal, and the clock may have a frequency as high as 400 kHz.

The invention notably relates to sophisticated systems aboard cars which offer a large number of possible uses and which, therefore, comprise a plurality of elements which have to communicate with one another. The aim is to implement a protocol for a dialog by bus between two microprocessors by means of software means. However, the processors of these elements must carry out a large number of tasks and at 400 KHz it is not feasible for them to test a wire every clock period so as to detect a start signal, because they would not have enough time left to execute their own tasks.

SUMMARY OF THE INVENTION

It is an object of the invention to solve this problem without adding an additional wire to the bus.

To this end, before the production of a start signal,
the master station
forces its clock terminal and subsequently its data terminal to the second voltage level,
subsequently maintains its clock terminal at the second voltage level for a predetermined period of time, after which it allows it to return to the first level,
the slave station
tests whether its clock terminal and its data terminal are at the second voltage level, and in that case
detects subsequently whether its clock terminal returns to the first voltage level,
and then forces its clock terminal to the second voltage level for a second predetermined period of time, after which it allows it to return to the first level,
and during this time the master station
tests whether its clock terminal is maintained at the second voltage level during said second predetermined period of time and if it subsequently returns to the first level,
and then allows its data terminal to return to the first level,
and said start signal is then generated.

The invention, therefore, is based on the idea of using initially a slow specific protocol which is defined for a specific use, and to switch subsequently to a conventional, faster protocol for which a variety of circuits are commercially available. Moreover, it is advantageous that before the formation of a start signal:
the slave station
forces its clock terminal to the second voltage level,
subsequently maintains its clock terminal at the second voltage level during a third predetermined period of time, after which it allows it to return to the first level,
the master station
tests if its clock terminal is at the second voltage level, and in that case
subsequently checks if its clock terminal returns to the first voltage level
and then forces its clock terminal to the second voltage level during a predetermined fourth period, after with it is allowed to return to the first level,
and said start signal is then generated,
and during this time the slave station
checks if its clock terminal is maintained at the second voltage level during said fourth predetermined period of time and if it subsequently returns to the first level,
and then waits the start signal generated by the master to transmit data in synchronism with the clock generated by the master.

Thus, because of the fact that the procedure is different when a slave requests the dialog, it is easy to settle a conflict between dialog requests arriving simultaneously from the slave and the master.

A device in accordance with the invention is notably characterized in that
in order to generate a dialog request signal, the microprocessor of the master station comprises software means
for forcing its clock terminal and subsequently its data terminal to the second voltage level,
for subsequently maintaining its clock terminal at the second voltage level during a predetermined first period of time, and subsequently allowing it to return to the first level, in order to respond to a dialog request signal from the master, the microprocessor of the slave station comprises software means for testing whether its clock terminal and its data terminal are at the second voltage level, for detecting that its clock terminal is returned to the first voltage level after having detected that it was at the second voltage level, and for then forcing its clock terminal to the second voltage level during a second predetermined period of time, and subsequently allowing it to return to the first level, the microprocessor of the master station also comprises software means for detecting, after having generated the dialog request signal from the master, that its clock terminal is maintained at the second voltage level during said second predetermined period of time and that it subsequently returns to the first level, and for then allowing its data terminal to return to the first level, after which said start signal is generated.

Moreover, a device in accordance with the invention is also characterized in that:

in order to generate a dialog request signal from the slave, the microprocessor of the slave station comprises software means for forcing its clock terminal to the second voltage level, for subsequently maintaining its clock terminal at the second voltage level during a predetermined first period of time, and for subsequently allowing it to return to the first level, in order to respond to a dialog request signal from the slave, the microprocessor of the master station comprises software means for testing if its clock terminal is at the second voltage level, for detecting that its clock terminal is returned to the first voltage level after having detected that it was at the second voltage level, and for then forcing its clock terminal to the second voltage level during a second predetermined period of time, and for subsequently allowing it to return to the first level, said the start signal then being generated, the microprocessor of the slave station comprises software means for detecting, after having generated a dialog request signal for the slave, that its clock terminal is maintained at the second voltage level during said second predetermined period of time and that it subsequently returns to the first level, for detecting the start signal generated by the master and for subsequently transmitting data in synchronism with the clock generated by the master.

A car radio receiver can be attractively equipped with a device in accordance with the invention.

These and other aspects of the invention will be apparent from and elucidated with reference to the embodiments described hereinafter.

DETAILED DESCRIPTION OF THE PREFERRED EMBODIMENTS

Figure 1:
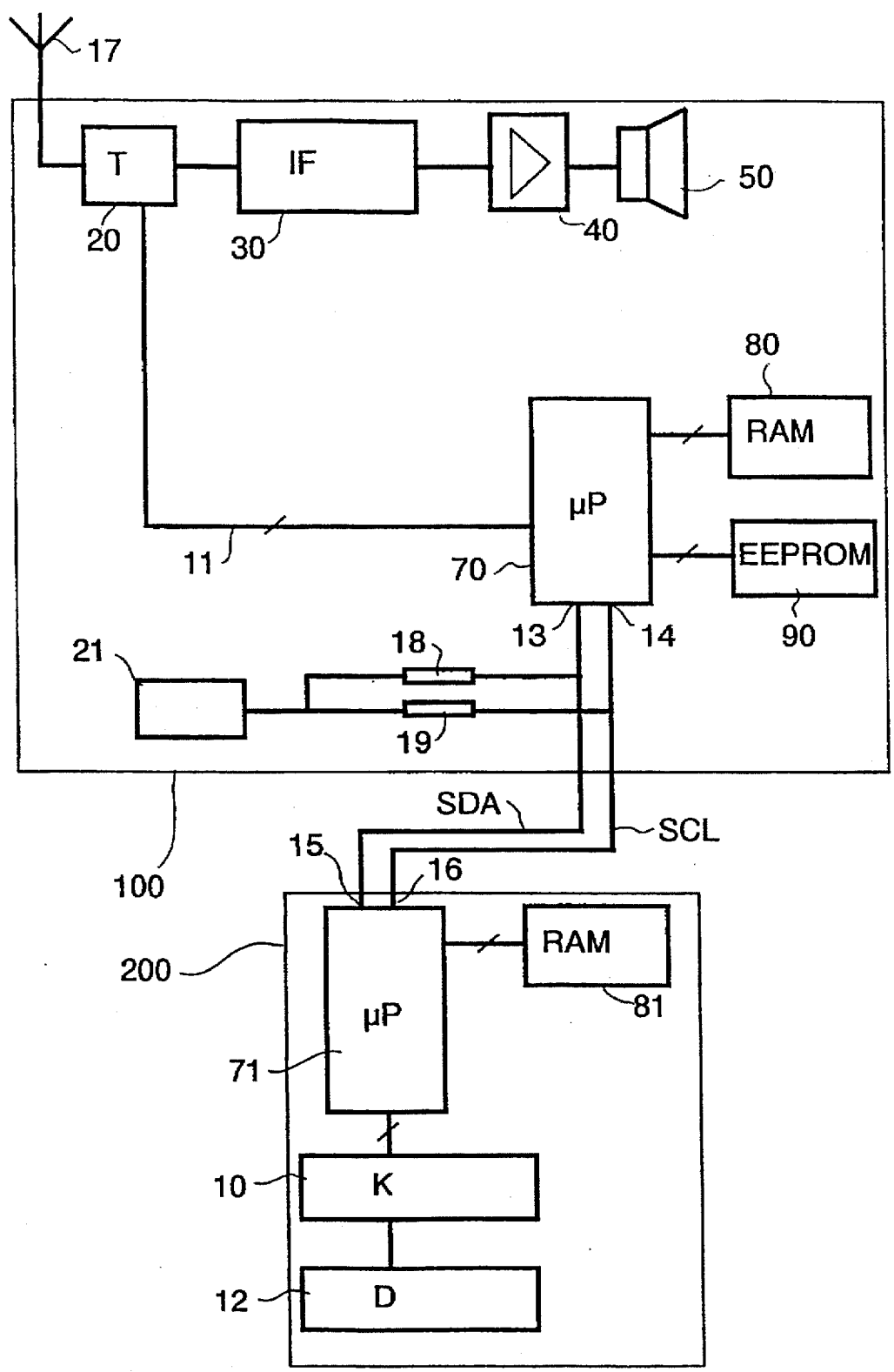
FIG. 1 shows a diagram of a car radio receiver provided with a device in accordance with the invention.

Subsequent to an aerial 17, the radio receiver shown in FIG. 1 comprises an element 20 of a known type (tuner) which comprises a tuning circuit and a frequency control circuit, followed by an element 30 which is also of a known type and comprises an intermediate frequency amplifier and a demodulator. The demodulated output signal of the element 30 feeds an audio amplifier 40 which is followed by a loudspeaker 50.

In contemporary receivers there is also provided a microprocessor 70 which has a plurality of tasks. It is connected among others to:

a volatile memory 80 of the so-called "RAM", type for the storage of provisional elements such as temporary calculation values or, generally speaking, the values which are not to be saved when the ignition of the vehicle is switched off, a permanent memory 90 of the so-called "EEPROM" type for the storage of definitive or temporarily definitive elements, such as the characteristics of stations to be tuned again one day or another. The memory RAM 80 may also be implemented in the microprocessor. The microprocessor 70 is provided with a software element which enables it to supply digital values which are applied, via a connection 11, to an input of the element 20 in order to select a tuning frequency. The EEPFROM memory 90 may contain, for example a table which scores the data resulting from various operations performed by the microprocessor 70 are stored. All elements described above are accommodated in a housing 100.

For the dialog with the user, there are provided a keyboard and a display, for example a liquid crystal display. For practical reasons they are accommodated in a housing 200 other than the housing 100. In addition to the keyboard 10 and the display 12, the housing 200 also accommodates a microprocessor 71 which has a plurality of tasks. It is connected, among others, to a volatile memory 81 of the so-called "RAM" type for the storage of provisional elements, for example temporary calculation values or, generally speaking, the values which are not to be saved when the ignition of the vehicle is switched off. The memory RAM 81 may also be included in the microprocessor.

The housings 100 and 200 are connected with the help of a two-wire bus whose wires are denoted by SDA and SCL and which interconnects the two microprocessors 70 and 71.

In the device shown in FIG. 1, the housing 100 with its microprocessor 70 constitutes a master station which enables control of the transmission and reception of data and comprises a data terminal 13 and a clock terminal 14; the housing 200 with its microprocessor 71 constitutes a slave station which also enables the transmission and reception of data and comprises a data terminal 15 and a clock terminal 16. The data wire SDA interconnects the data terminals of the microprocessors and the clock wire SCL interconnects the clock terminals of the microprocessors. Means are provided to urge the bus wires at a first voltage level in the absence of forcing by the stations, i.e. resistors 18 and 19 which pull up each of the bus wires to a voltage source 21 carrying said first voltage level. Each of the microprocessors can pull down the voltage of each of the bus wires to a low level by drawing current through the resistors 18 or 19.

Figure 2:
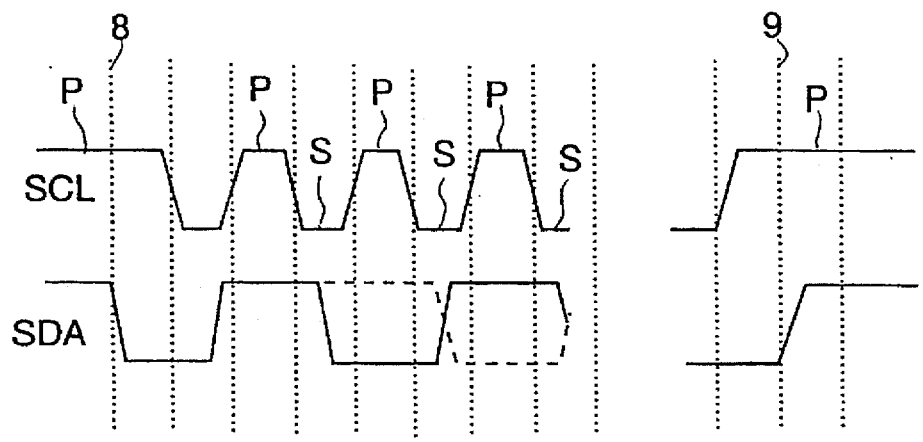
FIG. 2 shows the signals in the course of a known I²C procedure.

In the present description, the normal procedure for the transmission of data via the bus is essentially a known $I^2C$ procedure. It will be evident nevertheless that the invention can be used for any fast analog procedure utilizing a two-wire bus. As a review, the essential phases of an $I^2C$ procedure are shown in FIG. 2:

before the dispatch of data, a start signal is produced, indicating that the master station is ready to control the transmission of data. This signal consists in that the data wire SDA is allowed to remain at the first voltage level during a first part of an interval during which the clock is at the first level, indicated by the letter P at the extreme left in the drawing, after which in the course of the same interval P the wire SDA is forced to the second voltage level as from the instant denoted by the reference 8;

subsequently, the master station produces a clock signal on the clock wire SCL while leaving its terminal at the first voltage level P during each interval of a series of successive time intervals which are referred to as clock intervals and are denoted each time by the letter P, and by forcing this wire to a second voltage level S between said intervals, and binary data are transmitted by one station or the other while leaving the voltage on the data wire SDA at the first voltage level during an entire clock interval, indicated by P, in order to transmit a first data value, and while forcing the voltage on the data wire SDA to the second voltage level, again during an entire clock interval, in order to transmit a second data value. In this case, for example a first high value is transmitted during the first interval P encountered after the start signal, followed by a low value and a high value; a dashed line indicates another possibility by way of example;

after the dispatch of the data an end signal is produced, indicating that the master station has terminated its dialog. This signal consists in that the data wire SDA is forced to the second voltage level during a first part of an interval during which the clock is at the first level, indicated by the letter P at the extreme fight in the Figure, after which in the course of the same interval P this wire SDA is allowed to remain at the second voltage level, as from the instant indicated by the reference 9.

The invention relates to the ease where two microprocessors have to communicate. In the sense of $I^2C$, the master is the one generating the clock. The two elements can both request communication, but only one remains the master.

Figure 3:
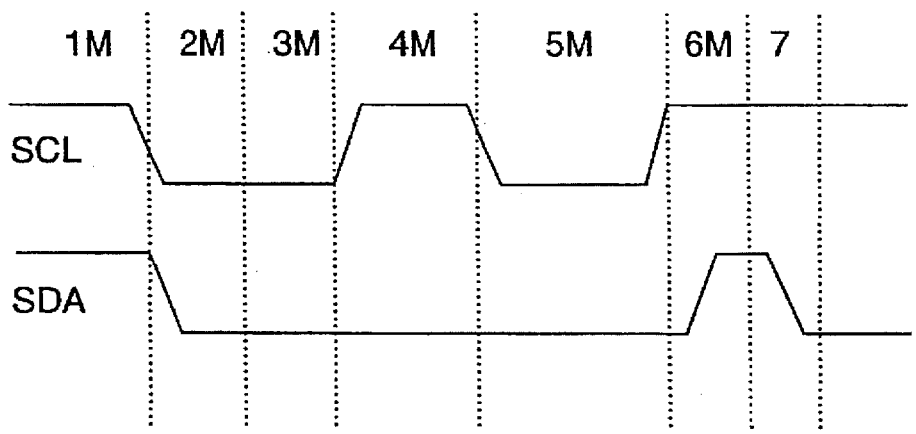
FIG. 3 shows the signals appearing upon a dialog request from the master.

Reference is now made to FIG. 3. The procedure differs from the $I^2C$ procedure because, in the case where the master station requests a dialog before the generation of the start signal of the $I^2C$ type:

the master station:

forces, between the instants denoted by the references 1M and 2M, its clock terminal SCL and then its data terminal SDA to the second voltage level, in this order, so as not to appear as a start signal, subsequently maintains its clock terminal at the second voltage level during a first predetermined period of time, 2M and 3M, and subsequently allows it to return to the first level in 4M, the slave station:

tests if its clock terminal and data terminal are at the second voltage level (2M and 3M) and in that case subsequently detects when its clock terminal returns to the first voltage level (4M), and then forces its clock terminal to the second voltage level during a second predetermined period of time (5M), and subsequently allows it to return to the first level (6M). The phase 5M is a kind of acknowledgement from the slave.

and during this time the master station:

detects that its clock terminal is maintained at the second voltage level during said second predetermined period 5M and that it subsequently returns to the first level, and then allows its data terminal to return to the first level, after which it generates said $I^2C$ start signal at 7.

Figure 4:
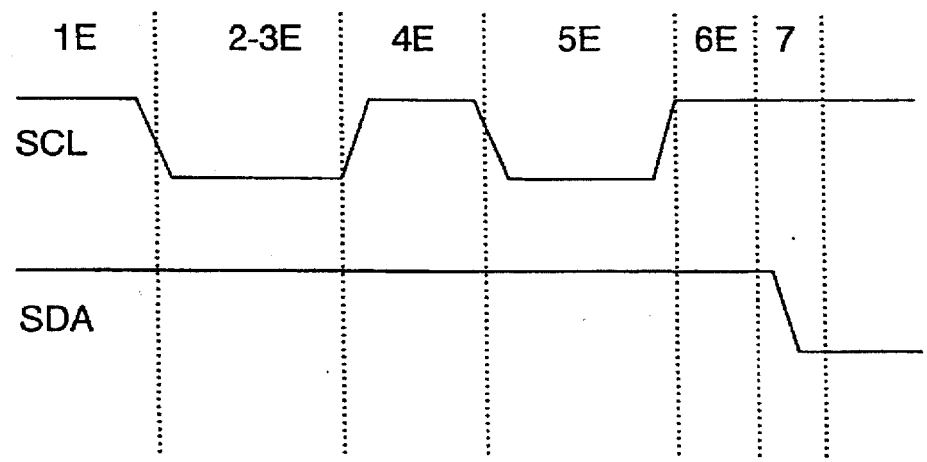
FIG. 4 shows the signals appearing upon a dialog request from the slave.

Reference is now made to FIG. 4. In the case where the slave station requests a dialog, the procedure is different:

the slave station forces the clock wire SCL to the second voltage level between the periods 1E and 2E (but not the data wire), subsequently maintains its clock terminal at the second voltage level during a third predetermined period 2–3E, and subsequently allows it to return to the first level in the period 4E, the master station tests if the clock wire SCL is at the second (low) voltage level, and in that case checks if the clock wire returns to the first voltage level between the periods 3E and 4E, and then forces its clock terminal to the second voltage level during a fourth predetermined period 5E, and subsequently allows it to return to the first level in order to indicate that it is ready for the requested dialog. The phase 5E is a kind of acknowledgement from the master and said $I^2C$ start signal is thus generated (7), and during this time the slave station checks if its clock terminal is maintained at the second voltage level during said fourth predetermined period 5E and, if so, it subsequently returns to the first level in 6E and awaits the start signal generated by the master in order to transmit data.

It is to be noted that in order to start one of these procedures, beforehand the wire SDA must be at the high level, referred to as the "first level". As there is only one master, it will be evident that it will initiate a dialog exclusively if it is not already involved in a dialog, so that the condition is necessarily satisfied, because in the case of a request from the slave, the latter does not pull the wire SDA to zero.

Each of the microprocessors has several jobs to carry out. To this end, they are programmed so as to run systematically all relevant jobs successively, for example jobs concerning the control of a system which is known as a radio data system or RDS, or the search of stations, or the control of the display and/or the keybaord, etc. Among these jobs there are those which, in the case of the master, consist of testing if SCL is zero; for the slave there are those which consist of testing if SCL and SDA are zero. The program leads the processors to run these tests from time to time. The time interval between two tests is not known in advance, because it depends on the time spent on the execution of other tasks between two tests. This interval is also dependent on the type of microprocessor; for example, a microprocessor of the so-called 8051 family may be concerned for the master microprocessor 70 and a microprocessor of the type TMP47C (Toshiba) for the slave processor 70. The duration of the tasks is limited and it has been found that the device operates satisfactorily in a car radio, utilizing said microprocessors, when all said predetermined periods of time are of the order of one millisecond. If the microprocessor of the slave were engaged in other tasks for more than one millisecond, it could not be able to notice the dialog request from the master; In such a case, the master would be aware of it, because of the absence of the acknowledgement phase from the slave and it would repeat its request a little later. Mutatis mutandis this also holds in the case of a dialog request from the slave.

Reference is again made to FIG. 1:

in the master station 100:

the microprocessor 70 produces, at the desired instant, a clock signal on the clock wire by leaving this wire at the first voltage level during each of the intervals of a series of successive time intervals, referred to as clock intervals, and by forcing this wire to a second voltage level between said intervals, the microprocessor 70 produces, at the desired instant, a start signal indicating that the master station is ready to control the data transmission, by leaving the data wire at the first voltage level during a first part of a clock interval, and by forcing this wire to the second voltage level in the course of the same interval, the microprocessor 70 produces, at the desired instant, a stop signal indicating that the master station has finished the control of the data transmission, by forcing the data wire to the second voltage level during a first part of a clock interval, and by allowing this wire to return to the first voltage level during the same interval, in each of the stations:

the microprocessor transmits binary data, if any, by leaving the voltage on the data wire at the first voltage level during an entire clock interval in order to transmit a first data value and by forcing the voltage on the data wire to the second voltage level during an entire clock interval in order to transmit a second data value, in order to generate a dialog request signal from the master, the microprocessor 70 of the master station comprises software means for forcing, before the production of a start signal, its clock terminal 14 and subsequently its data terminal 13 to the second voltage level, for maintaining subsequently its clock terminal 14 at the second voltage level during a predetermined first period of time, and subsequently allowing it to return to the first level, in order to respond to a dialog request signal from the master, the microprocessor 71 of the slave station comprises software means for testing if its clock terminal 16 and its data terminal 15 are at the second voltage level, for detecting that its clock terminal 16 is returned to the first voltage level after having detected that it was at the second voltage level, and for then forcing its clock terminal 16 to the second voltage level during a second predetermined period of time, and subsequently allowing it to return to the first voltage level, the microprocessor 70 of the master station comprises software means for detecting, after the generating of a master dialog request signal, that its clock terminal 14 is maintained at the second voltage level during said second predetermined period of time and that it subsequently returns to the first level, and for allowing its data terminal 13 to return to the first level, said start signal then being generated.

Moreover, if it is the slave requesting the dialog:

in order to generate a dialog request signal the microprocessor 71 of the slave station comprises, software means for forcing, before the production of a start signal, its clock terminal 16 to the second voltage level, for maintaining subsequently its clock terminal 16 at the second voltage level during a first predetermined period of time, and subsequently allowing it to return to the first level, in order to respond to a dialog request signal from the slave, the microprocessor 70 of the master station comprises software means for checking if its clock terminal 14 is at the second voltage level, for detecting that its clock terminal 14 is returned to the first voltage level after detection that it was at the second voltage level, and for then forcing its clock terminal 14 to the second voltage level during a second predetermined period of time, and subsequently allowing it to return to the first level, the microprocessor 71 of the slave station comprises software means for detecting, after the generation of a dialog request signal, that its clock terminal 16 is maintained at the second voltage level during said predetermined second period of time, and that it subsequently returns to the first level, and for then allowing its data terminal 15 to return to the first level, said start signal then being generated by the master.

Figure 5:
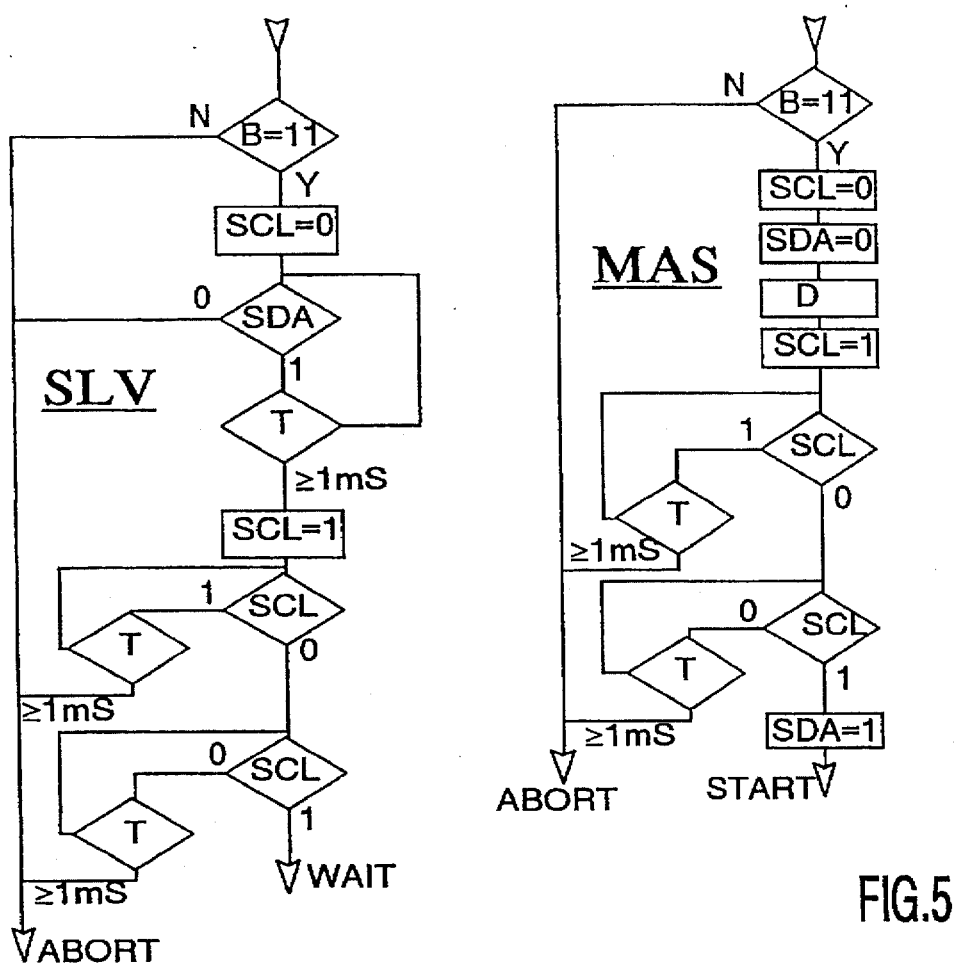
FIG. 5 shows two flowcharts representing the control software for a start process requested by the slave and by the master, respectively.

In order to generate the dialog request, the master utilizes software means as diagrammatically shown in the right-hand part of FIG. 5. The start of the process is shown at the top of the Figure. First of all, in the step B=11, the microprocessor of the master checks if the two wires SDA and SCL are 1. If this is not the case, a jump (N) leads to the cancellation of the request, referred to as ABORT. If the answer is yes (Y) the wire SCL is adjusted to zero during the operation denoted as SCL=0, after which the wire SDA is set to zero in the operation SDA=0; subsequently a delay D is inserted, followed by the operation of setting the wire SCL to "one", which operation is denoted as SCL=1. Subsequently, the value of the voltage on the wire SCL is tested. If the voltage is high, a jump denoted by the reference 1 leads to another test, referred to as T, in which it is verified if a predetermined period of time has elapsed since the operation SCL=1. If this is not the case, a return is made to the preceding test (SCL). If it is the case, denoted by the reference ">1 mS". The request is abandoned as indicated by "ABORT". If, during the looping of T on SCL, so long as the period is less than 1 mS, it is found that SCL=0, the process leads to a second test which is substantially identical, except that the values 0 and 1 for SCL are inverted. If there is an output signal for SCL=1, the wire SDA is set to 1 in the operation "SDA=1", after which I²C the start process is initiated as indicated by "START".

In order to generate the dialog request, the slave utilizes software means as diagrammatically shown in the left-hand part of FIG. 5. First of all, in the step B=11, the microprocessor of the slave verifies if the two wires SDA and SCL are 1. If this is not the case, a jump (N) leads to the cancellation of the request, denoted as ABORT. If the answer is yes (Y), the wire SCL is set to zero in the operation SCL=0. Subsequently, the value of the voltage on the wire SDA is tested. If the voltage is low, a jump 0 leads to the cancellation of the request, denoted as ABORT. If the voltage is high, a next test is performed, referred to as T, in which it is verified if a predetermined period of time has elapsed since the operation SCL=0. If this is not the case, a return takes place to the preceding test (SDA). If it is the case, denoted as ">1 mS", the process continues with the operation denoted as SCL=1 in which the wire SCL is set to the high level. After that, the last two operations are identical to those of the foregoing case (right-hand part of FIG. 5), except that at the end the slave does not initiate the start signal but awaits that signal from the master as denoted by the reference WAIT.

Figure 6:
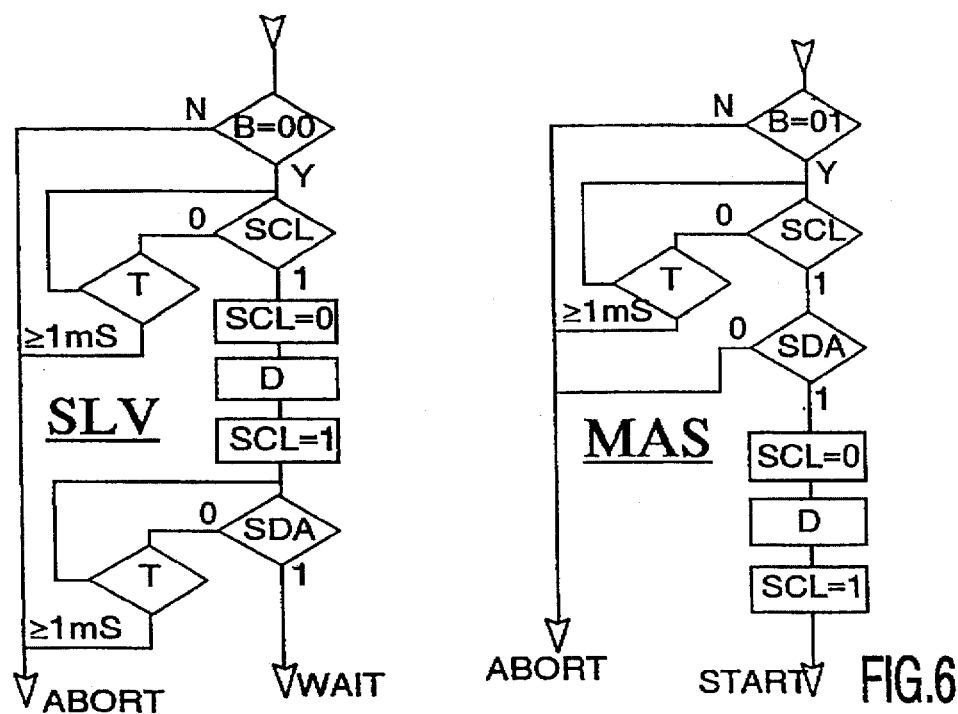
FIG. 6 shows two flowcharts representing the software for control of the process by the slave and by the master, respectively, in order to test whether the respective other one wishes to communicate.

In order to verify whether there is a dialog request from the slave and to respond thereto, if so, the master utilizes software as diagrammatically shown in the right-hand part of FIG. 6. First of all, in the step B=01, the microprocessor of the master verifies if the wire SDA=1 and the wire SCL=0. If not, a jump N leads to the cancellation of the verification, denoted as ABORT. Subsequently, the value of the voltage on the wire SCL is tested. If the voltage is low, a jump 0 leads to another test, denoted as T, in which it is verified if a predetermined period of time has elapsed since the test B=01. If this is not the case, a return takes place to the preceding test (SCL). If it is the case, denoted as ">1 mS", cancellation takes place, denoted as "ABORT". If, in the course of the looping of T to SCL even so long as the period is less than 1 mS, it is found that SCL=1, the procedure progresses to the next test, referred to as SDA, in which the value of the voltage on the wire SDA is verified. If it is low, a jump "0" leads to the cancellation of the verification, denoted as ABORT. If it is high, denoted as "1", the wire SCL is set to the low voltage, in the operation SCL=O, after which a delay D is inserted, followed by the setting to "one" of the wire SCL, denoted as SCL=1, after which the I²C starting process is initiated, indicated as "START".

In order to verify whether there is a dialog request from the master, and to respond thereto, if so, the slave utilizes software as diagrammatically shown in the left-hand part of FIG. 6. In the step marked B=00, the microprocessor of the slave first of all verifies if the two wires SDA and SCL are 0. If this is not the case, a jump (N) leads to cancellation of the verification, denoted as ABORT. If it is the case, the value of the voltage on the wire SCL is tested. If the voltage is low, a jump denoted as 0 leads to another test, denoted as T, in which it is verified whether a predetermined period of time has elapsed since the test B=00. If this is not the case, a return takes place to the preceding test (SCL). If it is the case, denoted as ">1 mS", cancellation takes place, denoted as "ABORT". If, in the course of the looping of T to SCL, so long as the time is less than 1 mS, it is found that SCL=1, the process continues with the operation SCL=0, in which the wire SCL is set to the low voltage, after which a delay D is inserted, followed by the operation of setting the wire SCL to "one", which operation is denoted as SCL=1. Subsequently, the value of the voltage on the wire SDA is tested. If the voltage is low, a jump 0 leads to another test, denoted as T, in which it is verified if a predetermined period of time has elapsed since the operation SCL=1. If this is not the case, a return takes place to the preceding test (SDA). If it is the case, denoted as ">1 mS", cancellation takes place (ABORT). If, in the course of the looping of T to SDA, so long as the time is less than 1 mS, it is found that SDA=1, the slave awaits the start signal from the master as denoted by WAIT.

What is claimed is:

1. A method for the transmission of data with the help of a two-wire bus, carried out in a device comprising:

a master station which enables control of the transmission and reception of data and comprises a data terminal and a clock terminal, a slave station which enables the transmission and reception of data and comprises a data terminal and a clock terminal, a data wire which interconnects the data terminals of the stations, a clock wire which interconnects the clock terminals of the stations, means for maintaining the bus wires at a first voltage level in the absence of forcing by the stations, each of the stations being capable of forcing one of the bus wires to a second voltage level, and the master station being capable of producing a start signal, which indicates that it is ready to control the transmission of data, characterized in that before the production of a start signal the master station forces its clock terminal and subsequently its data terminal to the second voltage level, subsequently maintains its clock terminal at the second voltage level for a predetermined first period of time after which it allows it to return to the first level the slave station tests whether its clock terminal and its data terminal are at the second voltage level, and in that case detects subsequently whether its clock terminal returns to the fast voltage level, and then forces its clock terminal to the second voltage level for a predetermined second period of time, after which it allows it to return to the first level, and during this period the master station tests whether its clock terminal is maintained at the second voltage level during said second predetermined period of time and if it subsequently returns to the first level, and then allows its data terminal to return to the first level, and said start signal is then generated.

2. A method for the transmission of data as claimed in claim 1, characterized in that before the formation of a start signal:

the slave station forces its clock terminal to the second voltage level, subsequently maintains its clock terminal at the second voltage level during a third predetermined period of time, after which it allows it to return to the first level, the master station tests if its clock terminal is at the second voltage level and in that case subsequently checks if its clock terminal returns to the first voltage level, and then forces its clock terminal to the second voltage level during a predetermined fourth period of time, after which it allows it to return to the first level, and said start signal is then generated, and during this time the slave station checks if its clock terminal is maintained at the second voltage level during said fourth predetermined period and if it subsequently returns to the first level, and then awaits the start signal generated by the master to transmit data in synchronism with the clock generated by the master.

3. A device for the transmission of data with the help of a bus, comprising:

a master station which comprises a microprocessor which enables control of the transmission and reception of data and comprises a data terminal and a clock terminal, a slave station which comprises a microprocessor which enables the transmission and reception of data and comprises a data terminal and a clock terminal, a data wire which interconnects the data terminals of the stations, a clock wire which interconnects the clock terminals of the stations, means for maintaining the bus wires at a first voltage level in the absence of forcing by the stations, means in each station for forcing one of the bus wires to a second voltage level, and means in the master station for producing a start signal which indicates that it is ready to control the transmission data, characterized in that in order to generate a dialog request signal, the microprocessor of the master station comprises software means for forcing its clock terminal and subsequently its data terminal to the second voltage level, for subsequently maintaining its clock terminal at the second voltage level during a predetermined first period of time, and subsequently allowing it to return to the first level, in order to respond to a dialog request signal from the master, the microprocessor of the slave station comprises software means for testing whether if its clock terminal and its data terminal are at the second voltage level, for detecting that its clock terminal is returned to the first voltage level after having detected that it was at the second voltage level, and for then forcing its clock terminal to the second voltage level during a second predetermined period of time, and subsequently allowing it to return to the first level, the microprocessor of the master station comprises also software means for detecting, after having generated the dialog request signal, that its clock terminal is maintained at the second voltage level during said second predetermined period of time and that it subsequently returns to the first level, and for then allowing its data terminal to return to the first level, after which said start signal is generated.

4. A device for the transmission of data as claimed in claim 3, characterized in that in order to generate a dialog request signal from the slave, the microprocessor of the slave station comprises software means for forcing its clock terminal to the second voltage level, for subsequently maintaining its flock terminal at the second voltage level during a predetermined first period of time, and for subsequently allowing it to return to the first level, in order to respond to a dialog request signal from the slave, the microprocessor of the master station comprises software means for testing if its clock terminal is at the second voltage level, for detecting that its clock terminal is returned to the first voltage level after having detected that it was at the second voltage level, and for then forcing its clock terminal to the second voltage level during a second predetermined period of time, and for subsequently allowing it to return to the first level, said start signal then being generated, the microprocessor of the slave station comprising software means for detecting, after having generated a dialog request signal, that its clock terminal is maintained at the second voltage level during said second predetermined period of time and that it subsequently returns to the first level, for then detecting the start signal generated by the master and for subsequently transmitting data in synchronism with the clock generated by the master.

5. A car radio receiver, characterized in that it is equipped with a device as claimed in claim 3.

6. A car radio receiver, characterized in that it is equipped with a device as claimed in claim 4.

* * * * *